(12) United States Patent
Keigley

(10) Patent No.: US 7,066,275 B1
(45) Date of Patent: Jun. 27, 2006

(54) ROCK SEPARATOR WITH BEVELED TINES AND REMOVABLE GRATES

(76) Inventor: Kevin V. Keigley, 10880 McKinley Hwy., Osceola, IN (US) 46561

( * ) Notice: Subject to any disclaimer, the term of this patent is extended or adjusted under 35 U.S.C. 154(b) by 0 days.

(21) Appl. No.: 10/950,352

(22) Filed: Sep. 24, 2004

Related U.S. Application Data (63) Continuation-in-part of application No. 10/684,976, filed on Oct. 10, 2003.

(51) Int. Cl.
*A01B 43/00* (2006.01)

(52) U.S. Cl. .................. 171/63; 171/135; 171/111; 37/903

(58) Field of Classification Search .................. 37/903, 37/901, 444, 405; 171/63, 111, 19, 135; 172/247

See application file for complete search history.

(56) References Cited

U.S. PATENT DOCUMENTS

| | | | | |
|---|---|---|---|---|
| 2,597,374 A * | 5/1952 | Richey | ....................... | 414/724 |
| 3,003,265 A * | 10/1961 | Lutjens | ....................... | 37/444 |
| 3,034,237 A * | 5/1962 | Wolfe et al. | ................... | 37/405 |
| 3,706,388 A * | 12/1972 | Westendorf | ................. | 414/724 |
| 3,834,567 A * | 9/1974 | Miller | ......................... | 414/724 |
| 3,904,052 A * | 9/1975 | Nordstrom | ................. | 414/725 |
| 4,125,952 A * | 11/1978 | Jennings | ..................... | 37/405 |
| 4,303,507 A * | 12/1981 | Smith | ......................... | 209/252 |
| 5,241,764 A * | 9/1993 | Modig | ......................... | 37/405 |
| 5,311,684 A * | 5/1994 | Van Dalfsen | ................ | 37/409 |
| 5,664,348 A * | 9/1997 | Omann | ........................ | 37/405 |
| 5,964,050 A * | 10/1999 | Svahn | ......................... | 37/409 |
| 6,092,606 A * | 7/2000 | Basler | ......................... | 171/63 |
| 6,408,551 B1 * | 6/2002 | Pettersson | .................... | 37/409 |
| 6,718,662 B1 * | 4/2004 | Schaff | ......................... | 37/405 |

* cited by examiner

*Primary Examiner*—Victor Batson
(74) *Attorney, Agent, or Firm*—Botkin & Hall, LLP (57) ABSTRACT

An implement for removing rocks and preparing soil for landscaping or seeding includes a bucket attached to the lift arm of a skidsteer loader by an appropriate hitch mechanism. The bucket includes a frame mounted on the outer end thereof which supports removable and replaceable grates having spacing therebetween for allowing rocks to be collected on the grate and dirt collected with the rocks to fall through the grates. Tines extend from the outer transverse edge the frame supporting the grates and are adapted to collect and dig under rocks which are forced up the tines and onto the grate by the normal forward movement of the skidsteer. Periodically, when the grates become full of rock, the operator pivots the implement, thereby dumping the rocks into the bucket. The bucket includes a perforated grated floor through which additional dirt may be removed from the rocks and dropped back onto the soil while the rocks remain in the bucket. Occasionally, when the bucket is full or nearly full, the operator dumps the rocks on a rock pile by dumping the bucket.

9 Claims, 9 Drawing Sheets

ROCK SEPARATOR WITH BEVELED TINES AND REMOVABLE GRATES

This application is a continuation in part of and claims the benefit of U.S. patent application Ser. No. 10/684,976, filed Oct. 10, 2003.

TECHNICAL FIELD

This invention relates to a landscaping implement for separating rocks from soil.

BACKGROUND OF THE INVENTION

Landscapers must often prepare lawns, landscaping, etc. This work often requires removal of rocks from the soil. Manual removal of rocks is labor intensive and is partially ineffective since some rocks will be buried just below the surface where they can inhibit growth of grass but on the other hand are not easily seen by workers. If mechanical equipment is used, often as much or more dirt as rocks are picked up for disposal. This obviously increases the time required, it also increases disposal cost since to the debris collected will be dirt that is hauled away with the rocks. Prior art devices, such as that disclosed in prior patent U.S. Pat. No. 6,739,404 enables the landscaper to grade, work and scarify soil and the grading of soil inherently removes some rocks.

The present invention provides an implement that may be mounted, preferably, on the lift arms of a front end loader through an appropriate hitch, so that the implement may be pivoted to change the angle of the implement with respect to the ground and also to enable raising and lowering of the implement to dump rocks therefrom as will hereinafter be described. Accordingly, the front end loader (or similar drive vehicle such as a tractor) is used to move the implement over soil having rocks to be removed. A frame is mounted on the forward edge of a bucket connected to the lift arms by a conventional hitch assembly. The frame has opposite transverse edges, one of which is attached to the open end of the bucket and the other terminates in a tined member carrying multiple spaced tines, which penetrate the soil as the implement is moved. The frame supports multiple removable and replaceable grates. Accordingly, the tines engage rocks either on the surface of the soil or buried just below the surface such that movement of the vehicle in the forward direction forces rocks to move along the tines and into the grating assembly. The grates are sized to retain rocks in excess of a predetermined size on the grate while the dirt and other debris falls through the grates and back onto the ground. When the grates become full, the operator rotates the implement to cause the rocks to move from the grates and into the bucket. Preferably, the floor of the bucket is perforated such that the rocks that remain in the bucket any dirt remaining on the rocks is discharged after it is shaken off the rocks by normal movement of the vehicle through the perforations in the floor of the bucket. When the bucket is full or nearly fully, the operator dumps the bucket in a debris pile or in a truck for debris removal. Accordingly, rocks are quickly and efficiently removed from the soil, but most if not all of the dirt is shaken from the rocks during normal movement of the vehicle and falls through the grates and/or the perforations in the floor of the bucket back onto the ground.

DESCRIPTION OF THE PREFERRED EMBODIMENT

Referring now to the drawing, an implement 10 made pursuant to the teachings of the present invention is illustrated installed on the lift arms 12, 14 of a conventional skidsteer loader generally indicated by the numeral 16. The skidsteer loader and implement 10 are provided with a pivot connection generally indicated by the numeral 18 between the arm 12 and a hitch assembly comprised of hitch plate 20. Hydraulic cylinder 22 carried by the skidsteer loader 16 is also preferably connected to the hitch plate 20 to thereby raise and lower the implement 10 relative to the ground by pivoting the implement 10 about the pivot point 18 while the arms 12, 14 remain in their lowered position as illustrated.

The implement 10 includes a bucket or receptacle generally indicated by the numeral 24 which includes a closed or solid backside 26 upon which the hitch plate 20 is mounted, a pair of closed ends 28, 30; and an open generally indicated by the numeral 32. Wheels 34 are mounted on opposite ends 28, 30 and which normally rest on the ground so that when hydraulic cylinder is used to pivot the implement 10, the bucket pivots about the axis defined by the axles of the wheels. The bottom or floor of the bucket 24 is comprised of perforated grading generally indicated by the numeral 36. Perforated deflector plate 38 extends upwardly at an angle with respect to the closed end 26, for deflecting rocks dumped into the bucket as will be hereinafter explained.

A frame generally indicated by the numeral 40 is mounted on the forward edge of the bucket or receptacle 24 and includes a transversely extending inner edge bar generally indicated by the numeral 42, which extends along the entire length of the bucket 24 between the end members 28, 30. The bar 42 includes outwardly projecting portions 44 which extend beyond the end members 28, 30. The portions 44 are sufficiently long that they extend beyond the wheels 34. Cross members 46 connect the bar 42 with an outer transverse blade generally indicated by the numeral 48. The transverse members 46 are attached to the bar 44 on the upper surface thereof viewing the Figures by bolts 50 that are sufficiently long that they project from their corresponding nuts which are snug against the upper surface of the transverse members 46 The blade 48 is attached to the upper surface of the transverse members 46 by bolts 52. The grating assembly consisting of individual grates 54a–f, which are supported on the bar 44 and transverse members 46 on the edge of the blade 48, and are held in place by a removable bar 56 which extends across the portion of the bar 42 between the side plates 28 and 30 and includes ears 58 on opposite ends thereof that extend over and assist in retaining end plates 60. End plates 60 are secured to the end bolts 50 on opposite ends of the bar 44 and also to the closed ends 28, 30 of bucket 24 by bolts 62. End plates 60 assist in retaining the gates 54a–f in place, and also include deflectors 64 for deflecting rocks picked up on the grates into the bucket. The ends 58 of the bar 56 extend over the plates to assist in retaining them in place. Multiple tines 66 are spaced transversely with respect to the diction of travel along the blade 48. The tines 66 are secured underneath blade 48 and each tine terminates in a beveled end 68 which permits the tines to dig under rocks partially embedded in soil as will hereinafter be disclaimed. By having the tines 66 located under blade 48 dirt can pass between the tines and under the blade. Blade 48 may be segmented into segments as illustrated or may be one solid blade.

Figure 1:
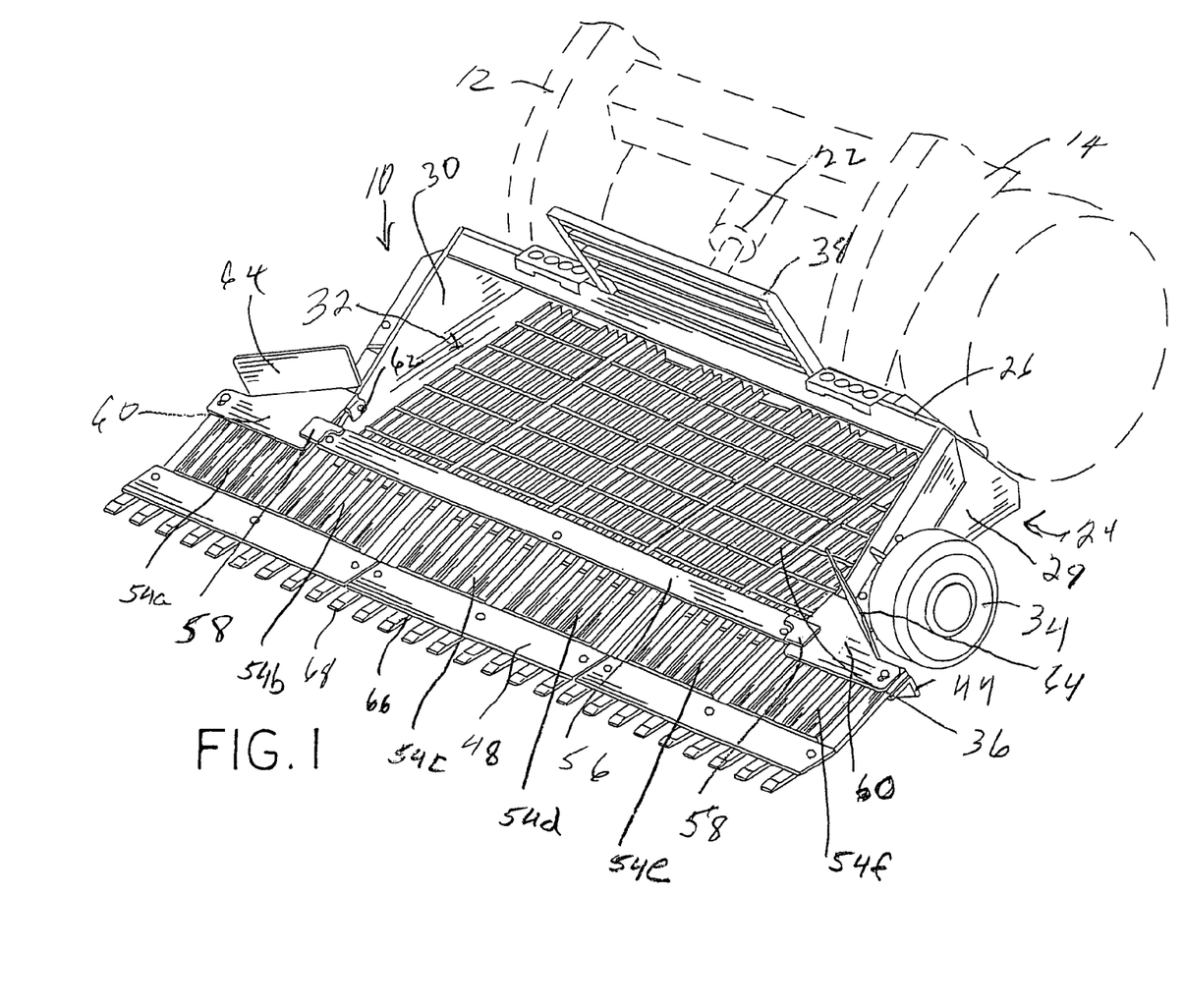
FIG. 1 is a view in perspective of an implement made pursuant to the teachings of the present invention, which as illustrated is installed on the lift arms of a skidsteer loader, which is shown in phantum.
Figure 2:
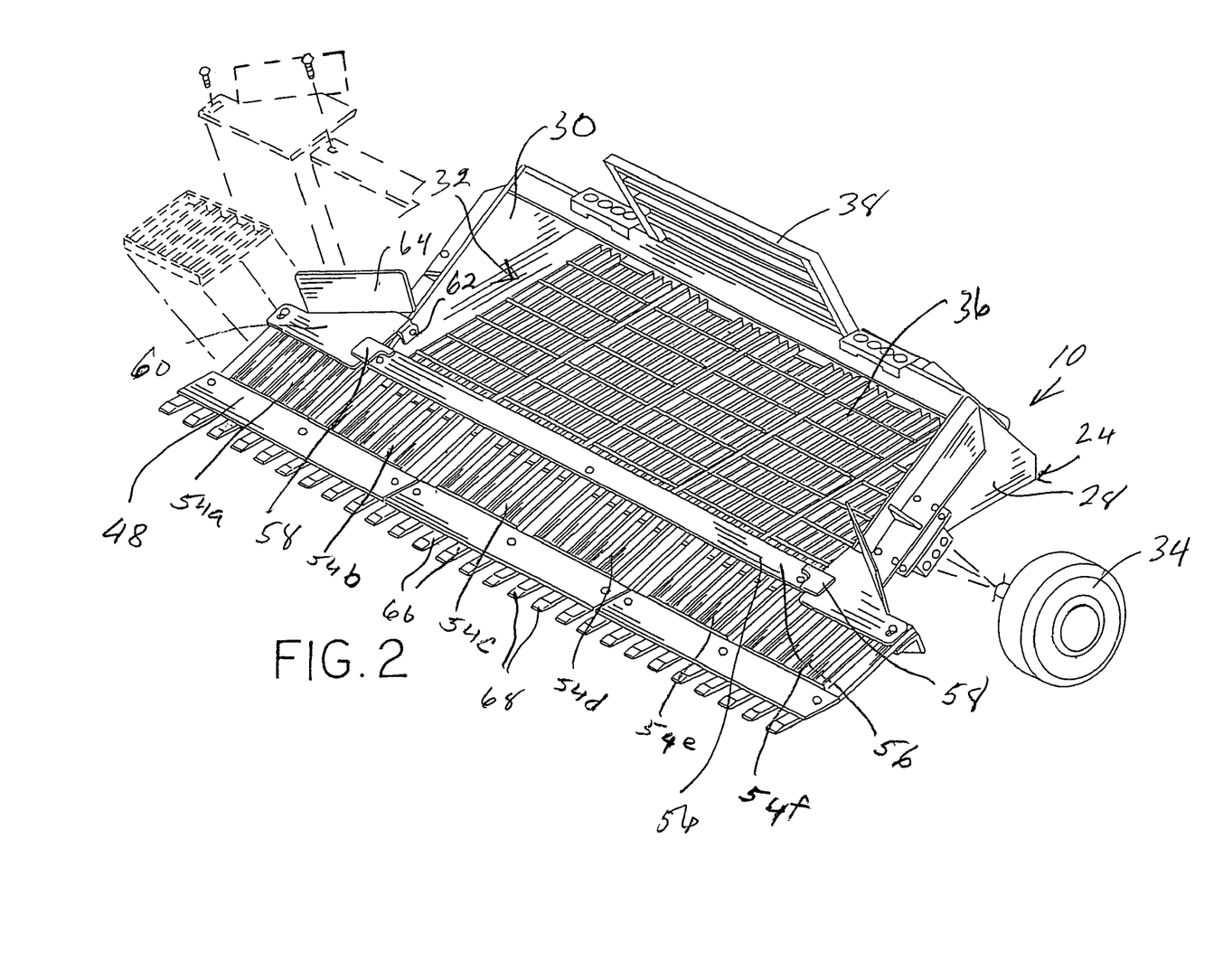
FIG. 2 is a view in perspective similar to FIG. 1, but showing some of the parts of the implement exploded off of the assembly to show details thereof.
Figure 3:
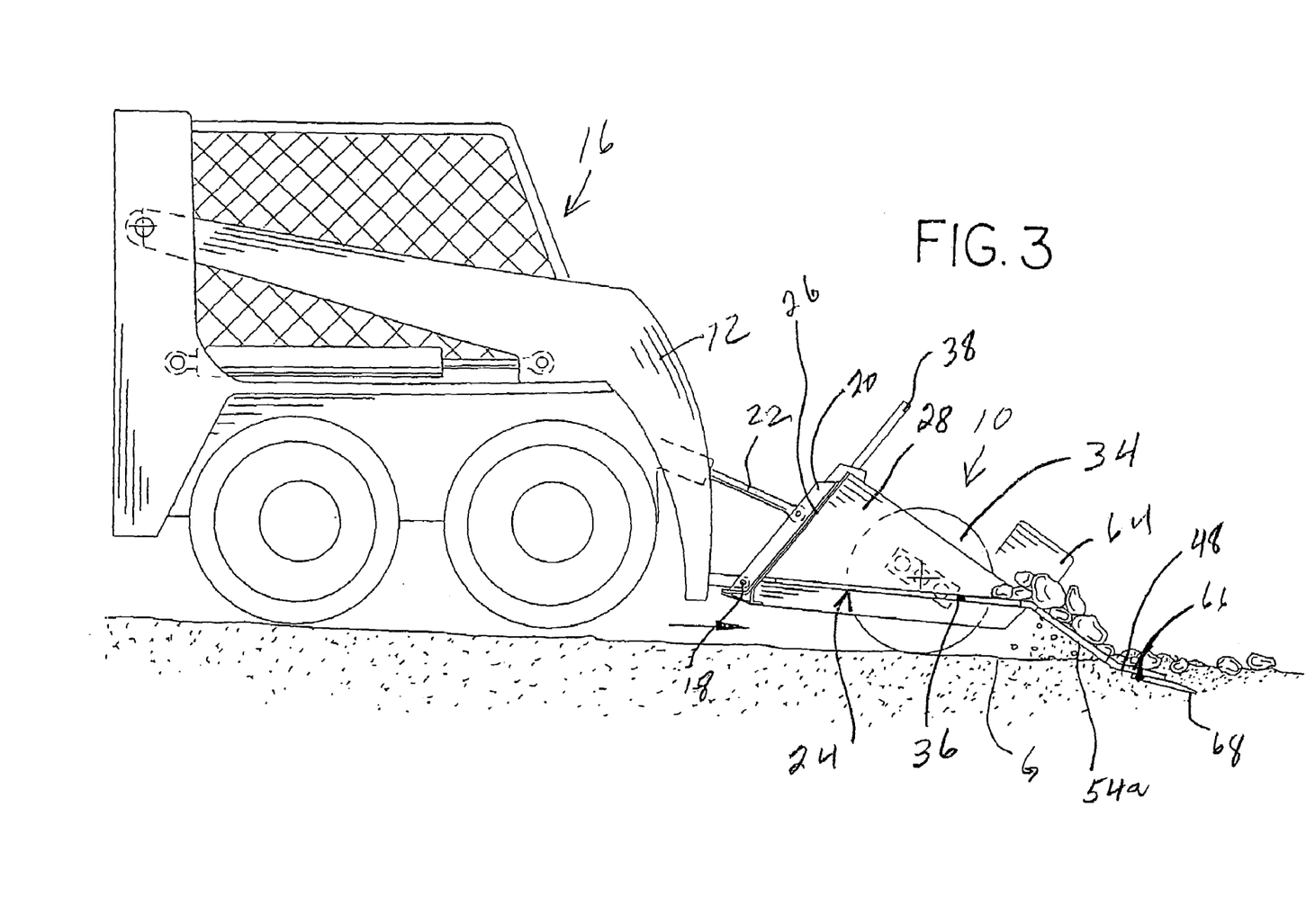
FIG. 3 is a side view of the implement and the skidsteer loader upon which the implement is mounted, illustrating the implement in an orientation in which rocks are removed from the soil and deposited in the implement.
Figure 4:
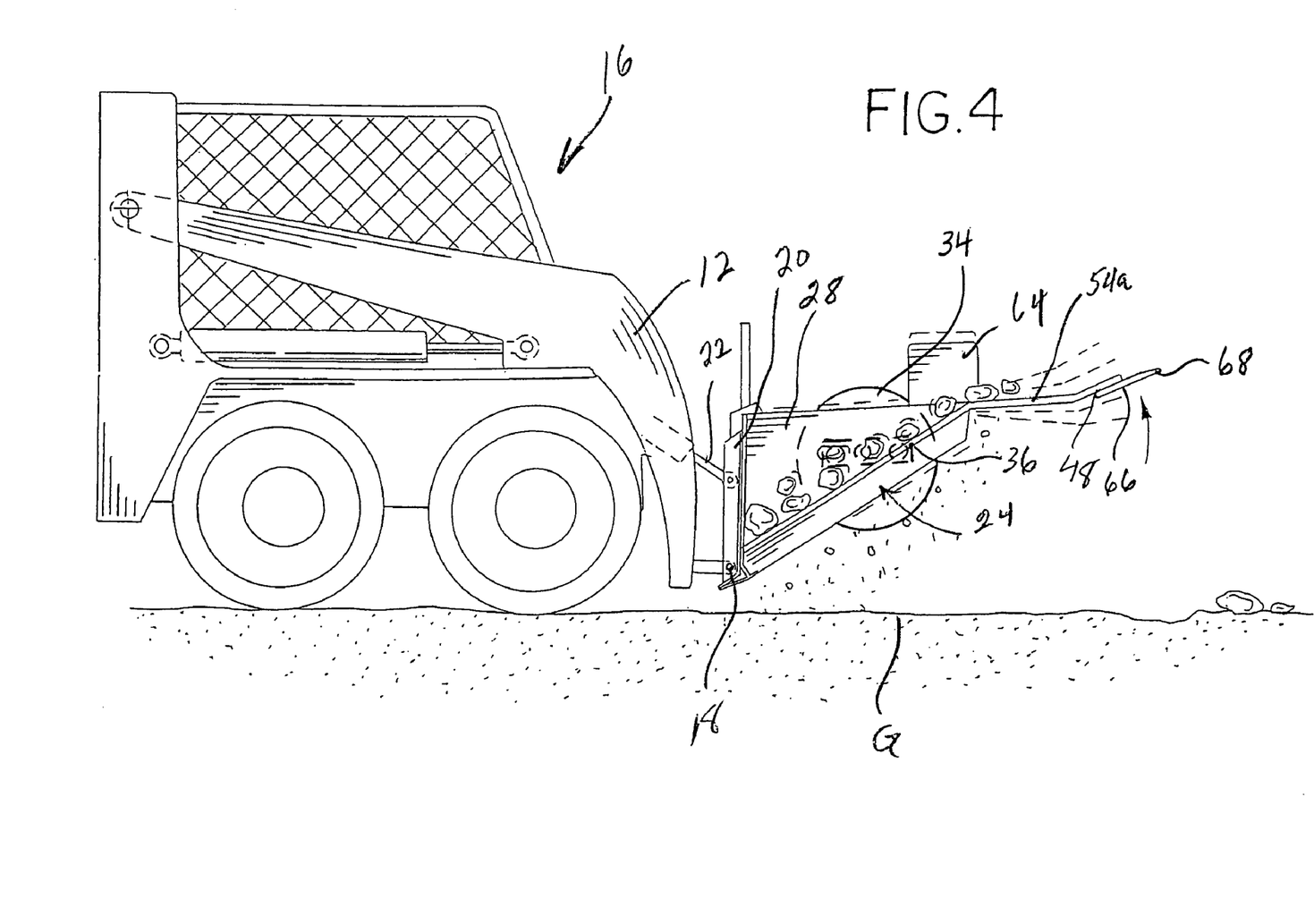
FIG. 4 is a view similar to FIG. 3, but illustrating the implement in the position to which it is moved when the rocks picked up by the implement are deposited in the bucket.
Figure 5:
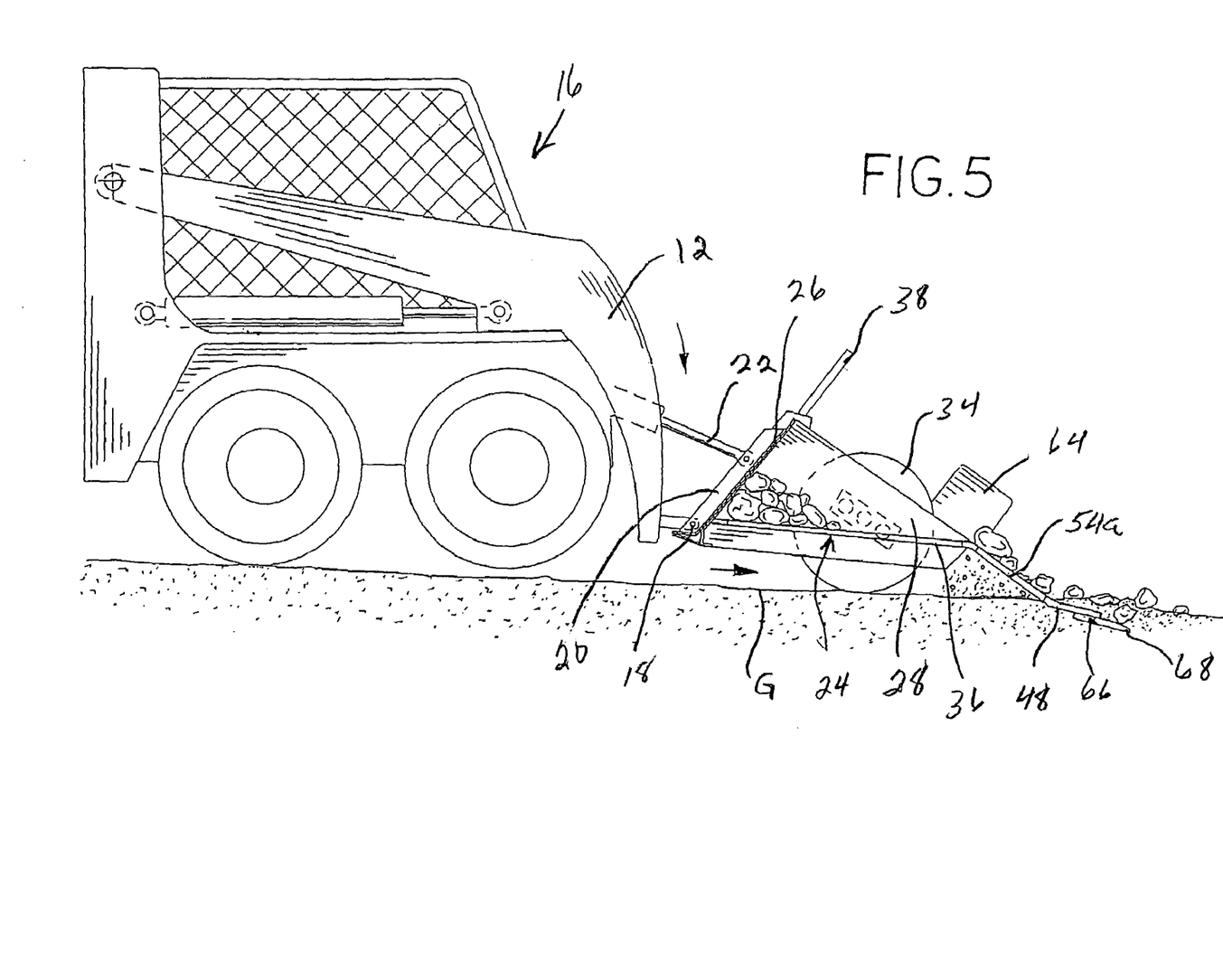
FIG. 5 is a view similar to FIGS. 3 and 4, but illustrating the implement engaged with the soil for picking up rocks with the rocks previously deposited in the bucket also illustrated.
Figure 6:
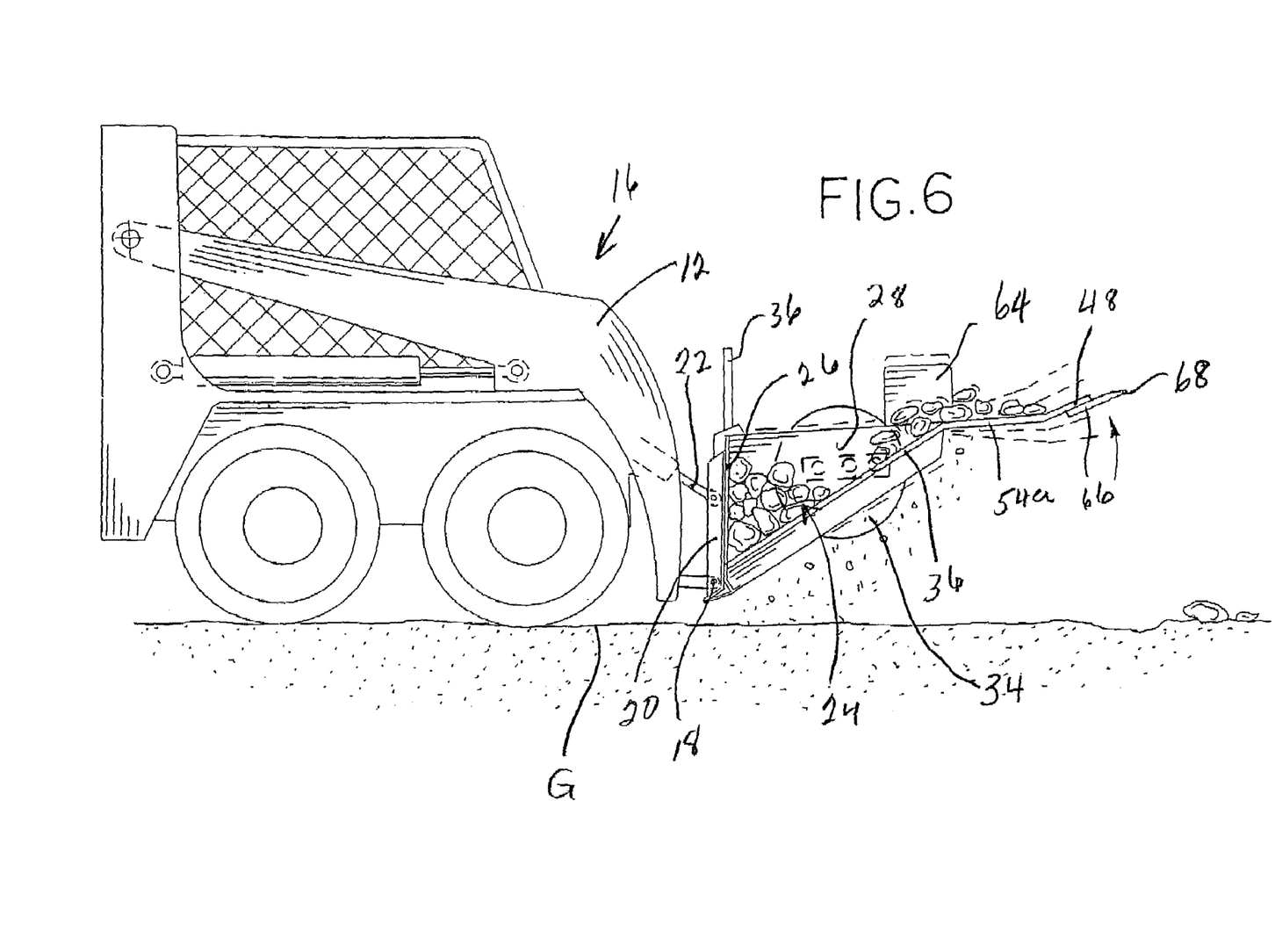
FIG. 6 is a view similar to FIGS. 3–5 in which additional rocks are being shown deposited in the bucket.
Figure 7:
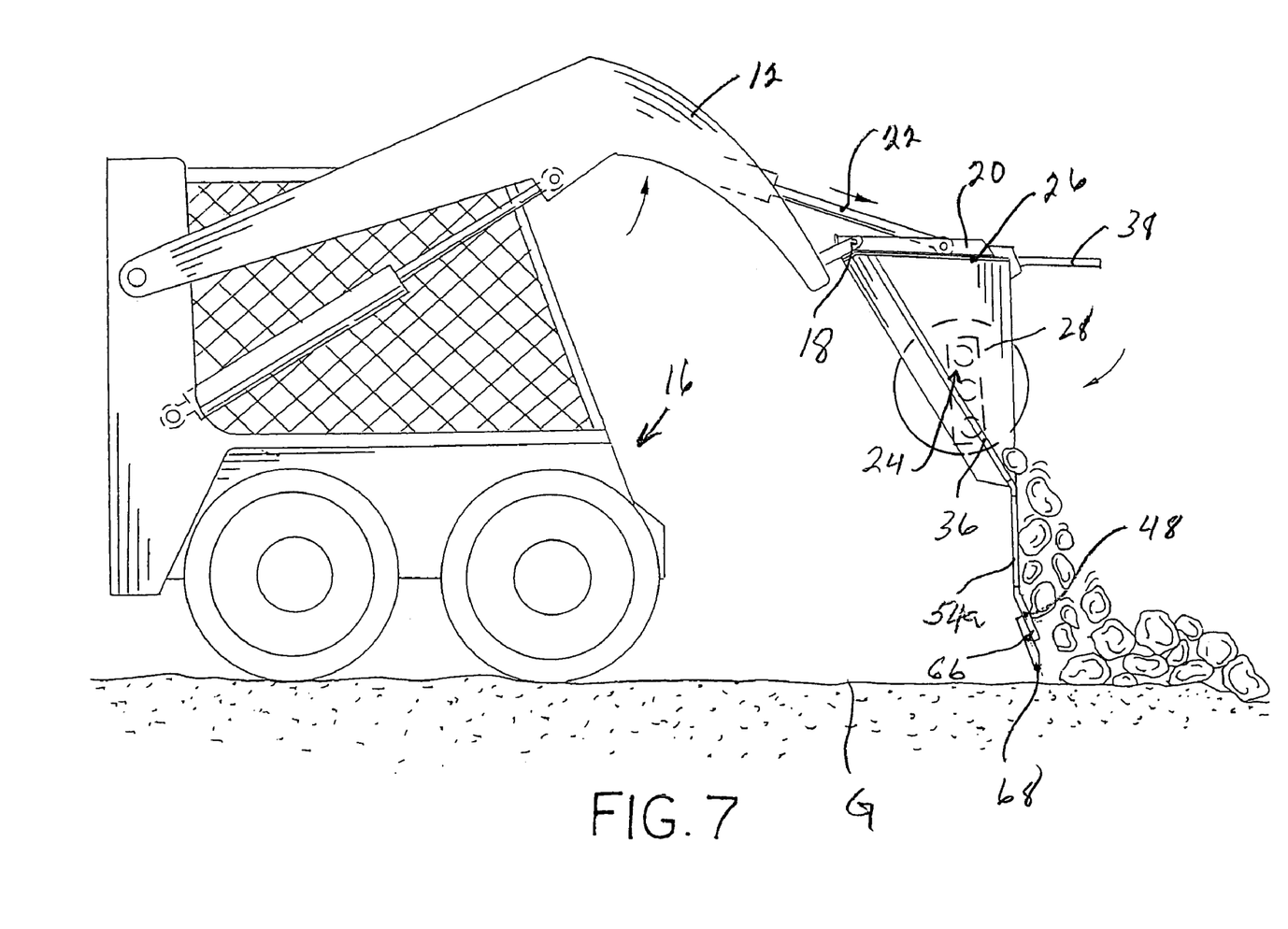
FIG. 7 is view similar to FIGS. 3–6, but illustrating the manner in which the bucket is dumped to deposit the rocks in a debris pile.
Figure 8:
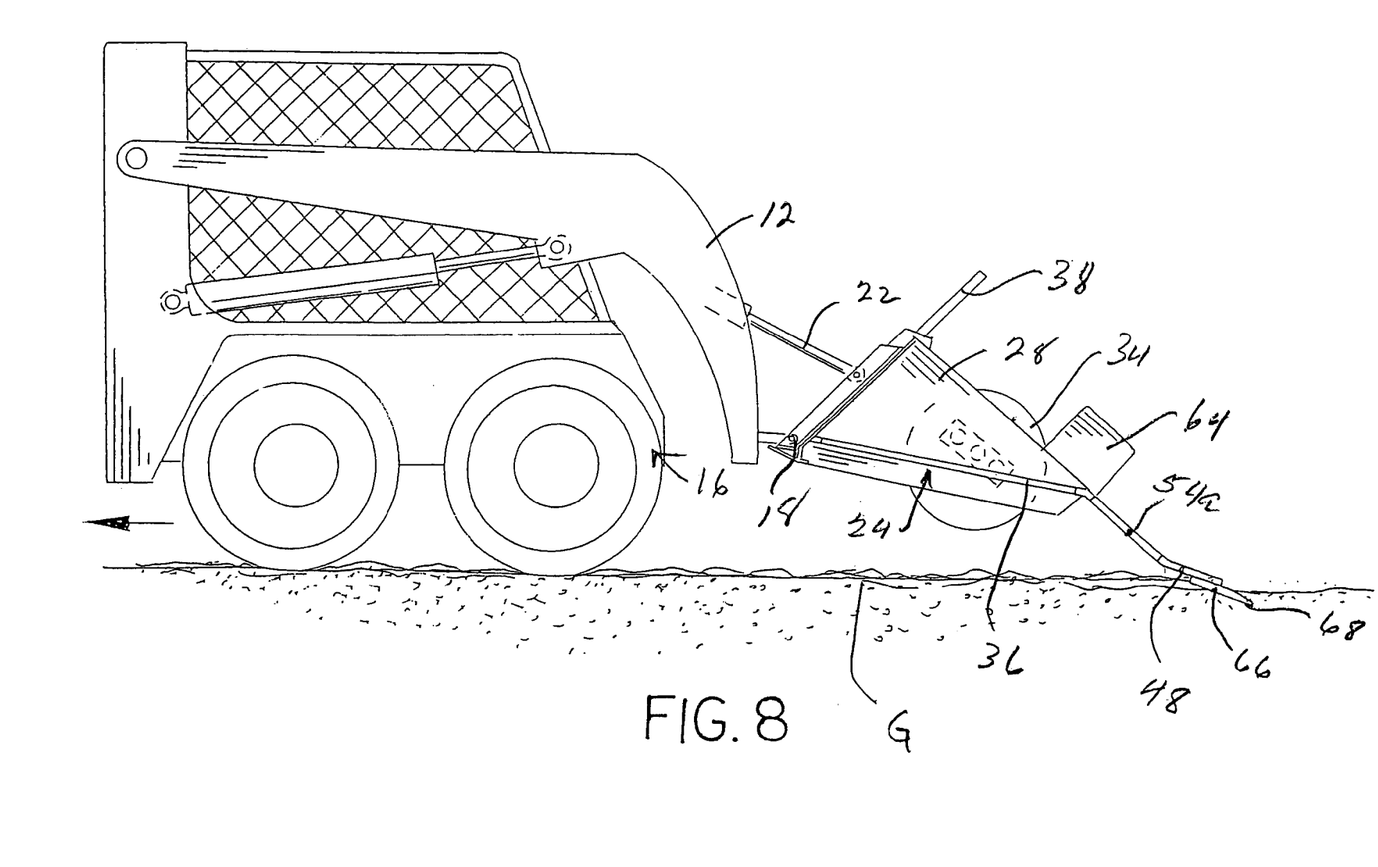
FIG. 8 is a view similar to FIGS. 3–7, but showing the implement raised off of the ground and at a sharper angle of attack so that the implement can also be used for scarifying or working the soil.
Figure 9:
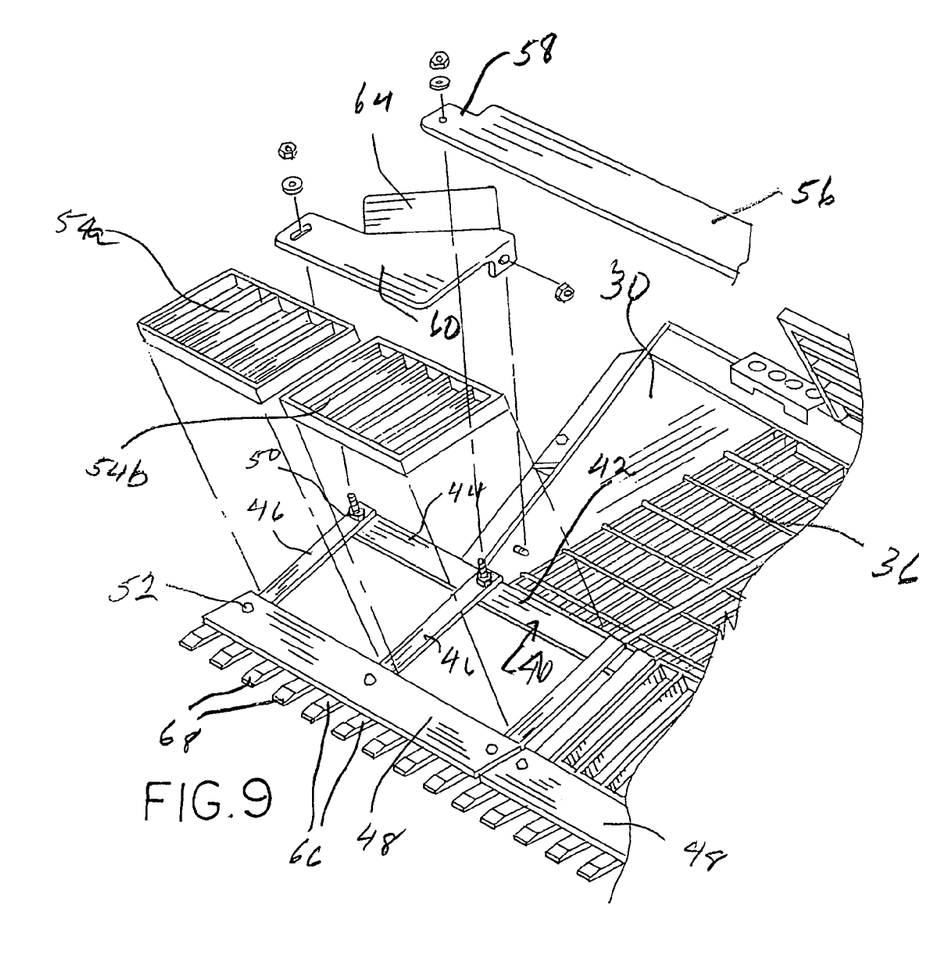
FIG. 9 is a fragmentary view similar to FIGS. 1 and 2, showing additional elements exploded away from the implement illustrating the manner in which the grates used by the implement are changed.

In operation, during forward movement of the skidsteer loader 16, the operator adjusts the angle of the implement 10 relative to the wheels such that the tines 66 and some or all of the blade 48 penetrate the surface of the ground G just enough such that rocks lying on the surface on the ground or are imbedded in the ground are dug out by the tines and are forced upwardly along the tines 66 and the blade 48 by forward movement of the skidsteer and thus are deposited on the grates 54 a–f. Large rocks may rest on two to more tines and loose dirt falls through the spaces between the tines. Normal forward movement of the implement 10 and skidsteer 16 while traveling over the ground G causes vibration of the stones on the grate and thus causes dirt to be dislodged from the stones whereupon the dirt falls through the grates back to the ground. As illustrated in FIG. 4, when the grates become full of rocks, the operator lifts the implement 10 upwardly, causing the rocks to fail off of the grates and into the bucket. The operator then promptly lowers the implement, as illustrated in FIG. 5, to again dislodge and gather rocks which are forced onto the grates and are later deposited in the bucket again as illustrated in FIG. 6. Finally, as illustrated in FIG. 7, the arms 14 of the skidsteer are raised and the bucket dumped, thereby dumping the rocks into a rock pile as illustrated in. FIG. 7. The perforations of the 36 in the bottom of the bucket 24 permit further removal of dirt from the rocks while the rocks remain in the bucket. As illustrated in FIG. 8, the tines 66 can also be used to work the surface if rocks have been removed by raising the bucket and tilting the implement 10 so that the skidsteer can be moved backwardly with the tines engaged with the ground as illustrated in FIG. 8 to control the size of the rocks collected. To change the grates, the bar 56 is removed by removing the appropriate bolts, and the end plates 60 are also removed similarly. Accordingly, the grates 54 a–f are readily changed, and the bar 56 and end plates 60 replaced.

The invention claimed is:

1. Implement for separating rocks from soil including a bucket, a hitch for pivotally connecting said bucket to a drive vehicle for moving said implement relative to soil from which rocks are to be removed, said bucket having an open side, a closed side, and a floor connecting the open and closed sides of the bucket, said bucket including a grating assembly having a ground engaging member separately mounted on said grating assembly, said grating assembly defining openings sized to retain rocks on the grating assembly while permitting soil to drop through the grating assembly, said ground engaging member extending along said grating assembly for removing rocks from the soil and depositing the rocks on the grating assembly, said ground engaging member includes multiple spaced tines projecting from said grating assembly for penetrating soil as the implement is moved, said tines engaging rocks on the soil, whereby movement of the implement forces rocks to move along said tines and onto said grating assembly.

2. Implement as claimed in claim 1, wherein said tines having a beveled forward end for engaging and lifting said rocks.

3. Implement as claimed in claim 1, wherein said grating assembly includes multiple grates and a frame, said grating assembly having multiple supports mounted on said frame for said grates, and a retainer assembly holding said grates in the frame, said retainer assembly being removable to permit removal and replacement of the grates independently of said tines.

4. Implement as claimed in claim 1, wherein said ground engaging member includes a blade extending along said grating assembly transverse to the direction of movement of the implement, said blade having an upper side and a lower side facing the ground, the tines being secured to the lower side of said blade, said tines being spaced transversely along said blade.

5. Implement for separating rocks from soil including a frame, a hitch assembly for mounting said frame to a drive vehicle for movement over soil having rocks to be removed, said frame having an outer transverse edge extending transversely to the direction of movement over soil, a grating assembly mounted on said frame, and a ground engaging member removably mounted relative to said grating assembly on said outer transverse edge, said grating assembly defining openings sized to retain rocks of a predetermined size on the grating assembly while permitting soil to drop through the grating assembly, said ground engaging member extending along said outer transverse edge for removing rocks from the soil and depositing the rocks on the grating assembly.

6. Implement as claimed in claim 5, herein said grating assembly includes multiple grates and corresponding grate supports mounted on said frame, and a removable retainer assembly for holding said grates in the frame but being removable to permit removal and replacement of the grates independently of said ground engaging member.

7. Implement as claimed in claim 6, said implement includes a bucket having a closed end, an open end, and a pair of opposite closed sides, said grating assembly including said removable retainer extending along the open end of the bucket.

8. Implement as claimed in claim 7, wherein said removable retainer includes a bar extending along the open end of the bucket, and a pair of retaining plates extending outwardly from the closed sides and fastened to said frame and to said bucket.

9. Implement as claimed in claim 8, wherein said bar includes a pair of ears extending from opposite ends of said bar to engage said retaining plates to assist in holding the latter in place.

* * * * *